US011909838B1

(12) United States Patent
Ratra et al.

(10) Patent No.: US 11,909,838 B1
(45) Date of Patent: Feb. 20, 2024

(54) DYNAMIC USER DATA FILTERING

(71) Applicant: Accenture Global Solutions Limited, Dublin (IE)

(72) Inventors: Neelima Ratra, Haryana (IN); Sameer Siddiqui, Pradesh (IN); Sandnya Dalvie, Thane (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/072,950

(22) Filed: Dec. 1, 2022

(51) Int. Cl.
*G06F 15/16* (2006.01)
*H04L 67/50* (2022.01)
*G06F 16/9535* (2019.01)

(52) U.S. Cl.
CPC ........ *H04L 67/535* (2022.05); *G06F 16/9535* (2019.01)

(58) Field of Classification Search
CPC ............................ H04L 67/535; G06F 16/9535
USPC .................................................. 709/203, 224
See application file for complete search history.

(56) References Cited

U.S. PATENT DOCUMENTS

| | | | | |
|---|---|---|---|---|
| 9,247,012 B2 * | 1/2016 | Dheap | ............... | G06Q 30/0201 |
| 9,798,764 B2 * | 10/2017 | Rohde | ................ | G06F 16/2379 |
| 10,062,085 B2 * | 8/2018 | Dheap | .................... | G06Q 30/02 |
| 2014/0278625 A1 * | 9/2014 | Maas | ..................... | G06Q 30/02 |
| | | | | 705/7.12 |
| 2017/0193382 A1 * | 7/2017 | Villa | .................... | G06F 16/2477 |
| 2019/0318031 A1 * | 10/2019 | Sim | ....................... | G06Q 40/123 |
| 2020/0175544 A1 * | 6/2020 | Bennett | ............. | G06Q 30/0201 |

* cited by examiner

*Primary Examiner* — Liang Che A Wang
(74) *Attorney, Agent, or Firm* — Fish & Richardson P.C.

(57) ABSTRACT

Methods, systems, and apparatus, including computer programs encoded on computer-storage media, for dynamic user data filtering. In some implementations, a method includes determining one or more values using data representing a sequence of one or more types of interactions between a user and content; using the one or more values to determine whether to include each interaction of the one or more types of interactions in the sequence within a reduced user data set; generating the reduced user data set by removing one or more interactions from the sequence based on determining not to include the one or more interactions using the one or more values; and providing the reduced user data set to a processing server.

20 Claims, 3 Drawing Sheets

DYNAMIC USER DATA FILTERING

BACKGROUND

The analysis of substantial amounts of user data can require significant energy and computational resources to perform. Sometimes, however, only a portion of the user data is needed to for generate a meaningful output. In those situations, the analysis of the remaining data may only serve to waste energy and time and increase computational expense associated with the analysis, resulting, for example, in excess carbon emissions.

SUMMARY

This application describes systems, methods, and apparatus to reduce the energy consumption of server computers by dynamically reducing the user data provided to servers for processing, while maintaining the accuracy of the output of the processing.

In some implementations, data to be processed by this technique is reduced by roughly half over earlier approaches. For a test processing load of 200 gigabytes, processing runtime performed by servers was reduced by over an hour with corresponding storage requirements decreased by more than 70 gigabytes. Each hour of service processing time requires energy typically produced using polluting sources of energy. By reducing processing time for a given processing load, the described systems, methods, and apparatus can help to mitigate climate change.

In some implementations, a local processing device obtains user data and removes a portion of the data before providing a reduced data set for processing by a server. For example, the local processing device can identify a threshold based on user data elements, such as user selections, user time spent performing one or more actions, among others. Using one or more thresholds, a local processing device can determine a portion of the data to remove that either does not affect a corresponding processing result or would decrease a corresponding processing result accuracy. Benefits, such as reduction in processing time and resource requirements, can be especially pronounced for large quantities of data, such as user internet browsing data.

In some implementations, by removing one or more data elements, corresponding model processing accuracy is improved. For example, by reducing noise through elimination of one or more data elements, processing of user data can provide more accurate results, such as recommendations for user processing, among others.

One innovative aspect of the subject matter described in this specification is embodied in a method that includes determining one or more values using data representing a sequence of one or more types of interactions between a user and content; using the one or more values to determine whether to include each interaction of the one or more types of interactions in the sequence within a reduced user data set; generating the reduced user data set by removing one or more interactions from the sequence based on determining not to include the one or more interactions using the one or more values; and providing the reduced user data set to a processing server.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include determining a subset of user activity data as the data representing the sequence of one or more types of interactions between the user and content.

In some implementations, determining the subset of user activity data includes detecting a user identifier that identifies the user in the subset of user activity data.

In some implementations, determining the subset of user activity data includes obtaining output from a model trained to detect actions of importance using one or more values indicating a difference between a first processing result and a second processing result.

In some implementations, the second processing result represents domain specific criteria for the model.

In some implementations, determining the one or more values includes determining a threshold for a specific user action using the data representing the sequence of one or more types of interactions between the user and content.

In some implementations, determining the threshold includes combining time measurements associated with each item of the sequence of one or more types of interactions; and determining the threshold using the combined time measurement and a number indicating a quantity of items in the sequence of one or more types of interactions.

In some implementations, actions include storing the data representing the sequence of one or more types of interactions in a data storage device with reduced cost or reduced energy consumption compared to a data storage device for storing the reduced user data set at the processing server.

In some implementations, determining the one or more values includes determining a number of selections made by the user while the content is displayed on an output device of a user terminal.

In some implementations, actions include comparing the number of selections made by the user while the content is displayed on the output device with a threshold number of selections; and determining, based on the comparison, to remove at least one interaction of the one or more interactions from the sequence.

In some implementations, actions include obtaining a recommendation for the user generated by the processing server using the reduced user data set.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
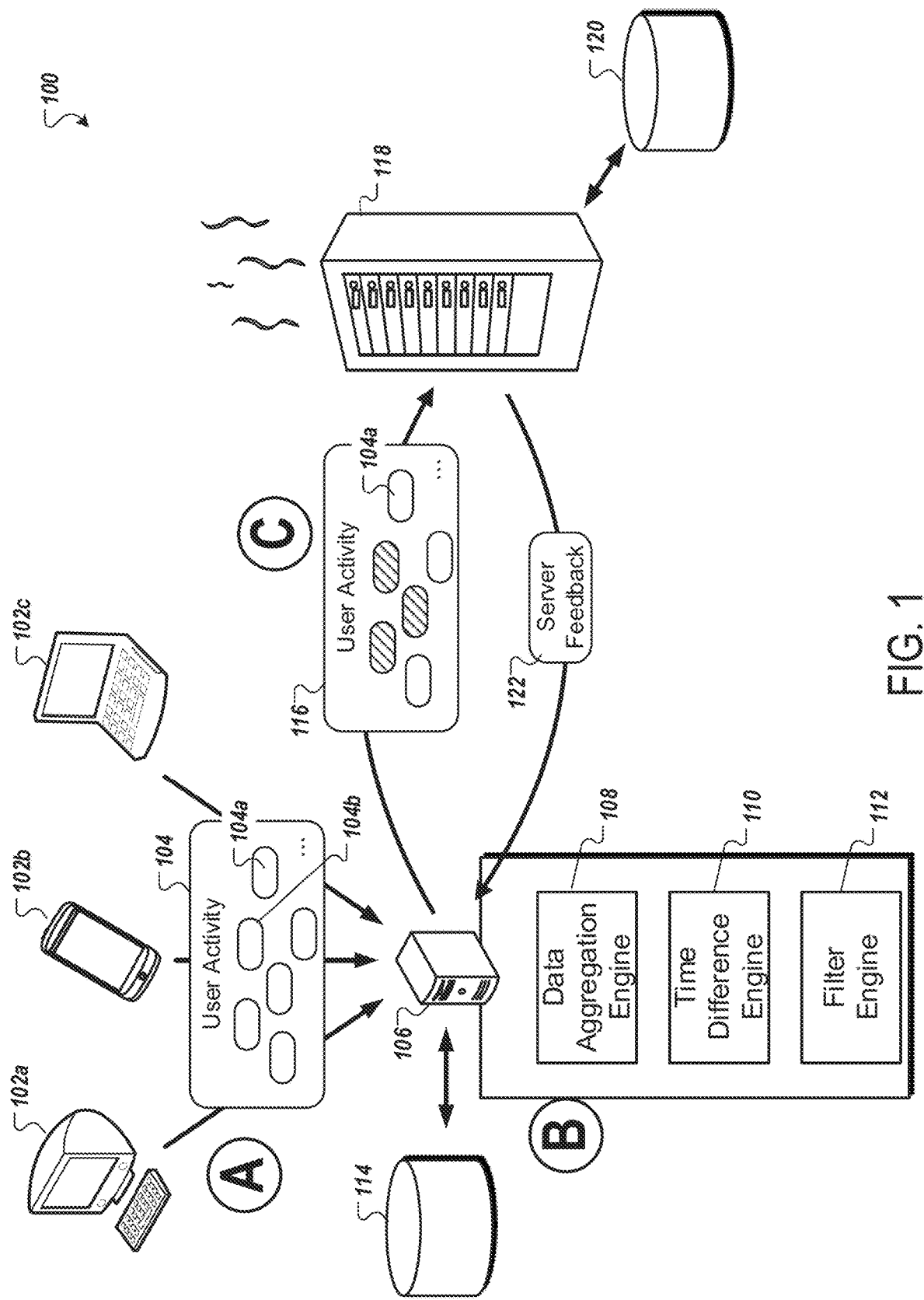
FIG. 1 is a diagram showing an example of a system for dynamic user data filtering.

FIG. 1 is a diagram showing an example of a system 100 for dynamic user data filtering. The system 100 includes a local computer 106 and a network server 118. The local computer 106 is configured to obtain raw user activity data 104 from devices 102a-c and dynamically generate a filtered data set 116 for further processing by the server 118. The filtered data set 116 can be used to generate more accurate results from the server 118 while reducing an amount of processing energy required by the server 118. In some implementations, the local computer 106 generates the filtered data set 116 while preserving key features of the raw user activity data 104. For example, the local computer 106 can use dynamic filtering, such as dynamically generated thresholds, to remove only portions of the raw user activity data 104 that are not likely to affect a processing result or would actually decrease a corresponding processing result accuracy.

In stage A of FIG. 1, the computer 106 obtains the raw user activity data 104. The computer 106 is communicably connected to the devices 102a-c. For example, the computer 106 and the devices 102a-c can be connected to the Internet, the computer 106 can provide parameters to allow the devices 102a-c to connect or transmit data to the computer 106.

In stage B of FIG. 1, the computer 106 performs one or more processes on the raw user activity data 104. The computer 106 uses a data aggregation engine 108, a time difference engine 110, and a filter engine 112 to generate the filtered data set 116 from the raw user activity data 104. The data aggregation engine 108, time difference engine 110, and filter engine 112 can be performed by one or more processors of the computer 106.

The data aggregation engine 108 aggregates the user activity data 104. In some implementations, the data aggregation engine 108 determines one or more items of the activity data 104, e.g., element 104a and element 104b, are associated with one or more user sessions of a first user. For example, the data aggregation engine 108 can identify a unique identifier of the device 102a or a unique identifier of a user of the device 102a in one or more elements of the user activity data 104. The one or more elements of the user activity data 104 can represent a sequence of interactions between a user and the device 102a.

In some implementations, interactions represent a user selecting one or more items. For example, a user can select a video and watch the video for a given duration. A device of the devices 102a-c can provide an identifier of a given video and a duration indicating how long a user watched the video in one or more elements of the user activity data 104. In another example, a user can select items for sale by either viewing the item or placing the item in a virtual shopping cart. A device of the devices 102a-c can provide an identifier of an item a duration indicating how long a user viewed the item or how long the user viewed the item before selecting the item for a shopping cart in one or more elements of the user activity data 104.

In some implementations, other durations of interactions by users are recorded by one or more of the devices 102a-c and included in one or more elements of the user activity data 104. User activity data 104 can include a user selecting a link to navigate to a webpage as well as subsequent activity, such as subsequent selections made by the user or a lack of selections made by the user. In some implementations, selections are made using a touch screen, virtual reality hardware, or traditional computing input/output interfaces.

The time difference engine 110 determines a time duration for one or more interactions in a sequence for a given user or device. For example, the time difference engine 110 can parse the user activity data 104 to determine data of the user activity data 104 that indicates a duration for a given interaction.

In one case, the time difference engine 110 can determine, for a given interaction sequence of a user, that the user viewed an item, e.g., a laptop for sale on a website, for 25 seconds followed by viewing a second item, e.g., an article of clothing, for 3 seconds. The durations for such example interactions can be recorded and provided by one or more of the devices 102a-c. The time difference engine 110 can parse the user activity data 104 to determine a duration for each interaction recorded by a device.

In some implementations, the time difference engine 110 determines one or more threshold time durations. For example, the time difference engine 110 can identify one or more interactions of a same type. Types of interactions can include watching a video, viewing an item, adding an item to a virtual cart, among others. Types of interactions can include a display impression indicating a user selecting a particular digital component on a webpage and subsequent actions by the user. Types of interactions can include a paid search impression indicating a user selecting a digital component representing a webpage within search results and subsequent actions by the user.

In some implementations, the time difference engine 110 determines one or more threshold time durations using a collection of one or more interactions of a same type. For example, the time difference engine 110 can identify three instances of watching a video, four instances of viewing an item, and one instance of adding an item to a virtual cart. The time difference engine 110 can generate a threshold time duration for each interaction type.

In some implementations, the time difference engine 110 uses an average of durations for a given interaction type as a threshold time duration. For example, the time difference engine 110 can determine time durations for one or more interactions for a specific user or device. The time difference engine 110 can sum the time durations and divide by a number representing the one or more interactions. The result can be used by the time difference engine 110 as a threshold time duration.

In some implementations, the local computer 106 determines one or more interaction types for threshold calculation. For example, the local computer 106 can determine interaction types that are representative or are statistically relevant for processes to be performed by the server 118.

In some implementations, the local computer 106 uses a trained model. For example, the local computer 106 can train a model to determine interaction types of importance. The local computer 106 can perform sample processes with different interaction types missing or subtypes of interaction types missing, e.g., duration times below or above a certain value, to generate results. The local computer 106 can compare the generated results with known correct results. The local computer 106 can generate an error term to determine which interaction types are more important, e.g., smaller resulting error term compared to another set of interaction types, or less important, e.g., greater resulting error term compared to another set of interaction types.

In some implementations, a model used by the local computer 106 is a random forest model. For example, the model used by the local computer 106 to determine interaction types or subtypes of interaction types of importance, can include multiple decision trees. Each decision tree can include one or more interaction types and corresponding importance. In some implementations, other statistical models are used. For example, methods can include boosting and gradient descent, support vector machines and kernel methods, Bayesian methods, regression models, recursive partitioning, among others. In some implementations, a trained model is implemented using gradient boosting or extreme gradient boosting.

In some implementations, a model used by the local computer 106 uses domain specific criteria to determine one or more interaction types of importance. For example, the domain specific criteria can represent objectives for the model or subsequent processing of the user activity data. A domain can represent a specific use case for processing and generating processing results from filtered user activity data.

The filter engine 112 determines, for each aggregated group from the user activity data 104, interactions to remove using a threshold time duration. For example, the filter engine 112 can compare time durations of one or more interactions in an aggregated group to a threshold time duration determined by the time difference engine 110. In some implementations, the filter engine 112 removes interactions with a time duration that is less than a threshold time duration. In some implementations, the filter engine 112 removes interactions with a time duration that is less than or equal to a threshold time duration. In some implementations, the filter engine 112 removes interactions with a time duration that is greater than, or greater than or equal to, a threshold time duration.

The local computer 106 generates the filtered data set 116 and, in stage C, provides the filtered data set 116 to the server 118. In some implementations, the filter engine 112 filters out the element 104*b* but does not filter out the element 104*a*. For example, the filter engine 112 can determine, using one or more duration thresholds, that the element 104*a* satisfies a given duration threshold but that the element 104*b* does not satisfy a given duration threshold, e.g., the element 104*b* is included in the user activity 104 but not the filtered user activity 116. In some implementations, the element 104*b* is a part of noise identified using one or more thresholds generated by the local computer 106.

In some implementations, the local computer 106 and the server 118 are communicably connected. For example, the local computer 106 can be connected to the Internet and the server 118 can be connected to the Internet. The local computer 106 can connect to the server 118 using the Internet. In some implementations, the local computer 106 connects to the server 118 using a secure gateway.

In some implementations, the server 118 provides server feedback 122 to the local computer 106. For example, the server 118 can provide server feedback 122 indicating processing performed on the filtered data set 116 by the server 118. The server feedback 122 can include data indicating one or more performance results. The server 118 can generate one or more performance results by processing, using one or more computation processes, the filtered data set 116.

In some implementations, the server 118 predicts, using the filtered data set 116, actions by one or more of the users of the devices 102*a*-*c*. For example, the server 118 can provide one or more portions of the filtered data set 116 to a trained model. The model can be trained by the local computer 106, or other device, to predict interests or future actions by users of one or more of the users of the devices 102*a*-*c*.

In general, reducing noise in user activity data can be difficult using traditional methods. If not careful, systems reducing user activity data can inadvertently reduce the data size by element removal where such reduction creates bias in results generated using the data. By determining a dynamic filter using collected user activity, the system 100 can reduce user activity data to reduce energy and processing requirements of the server 118 while maintaining, or increasing, accuracy. As a dynamic filter, the filtering applied by the local computer 106 can generate less or no bias in a resulting filtered data set compared to static filters or other conventional methods. Bias can include inaccuracies in data where some processing results are favored over others or values are skewed away from a correct value in a pattern.

In some implementations, the server 118 has higher operating costs or energy requirements than the local computer 106. In some implementations, the server 118 produces more greenhouse gases from corresponding electricity usage and generation than the local computer 106. For example, less data processed by the server 118 can decrease an amount of associated greenhouse gas emissions generated to power one or more devices of the server 118.

In some implementations, the server 118 is not available to store all or a portion of the user activity 104. For example, the server 118 could have reached a storage limit or could reach a limit if it had to store all or a portion of the user activity 104.

In some implementations, the local computer 106 filters the user activity 104 to allow storage components of the server 118, e.g., storage 120, to store the filtered data 116. For example, the local computer 106 can obtain a memory storage threshold. The local computer 106 can obtain a memory storage threshold from the server 118 or other device. In some implementations, the local computer 106 filters the user activity 104 such that a resulting filtered data 116 is less than or equal to an amount of memory available at the server 118, e.g., in the storage 120.

In some implementations, the local computer 106 adjusts one or more thresholds to generate filtered data that satisfies a memory storage size available at the server 118. For example, the local computer 106 can increase or decrease thresholds by a factor, percentage, or static value until, after filtering using the thresholds, the generated filtered user activity 116 satisfies a memory storage size available at the server 118, e.g., the resulting filtered data 116 is less than or equal to an amount of memory available at the server 118.

In some implementations, the local computer 106 scales thresholds by a factor or percentage. In some implementations, the local computer 106 subtracts or adds value, e.g., static numerical values or dynamic numerical values such as values based on an existing threshold, to thresholds. The local computer 106 can subtract a fraction of an existing threshold from the existing threshold to generate an updated threshold to be used for an iteration of filtering to generate filtered data that satisfies a memory storage size available at the server 118.

In some implementations, the computer 106 stores or reads data from storage 114, such as computer memory storage. The storage 114 can store or read operations that, when performed by one or more processors of the computer 106, cause the computer 106 to perform one or more operations discussed in reference to the data aggregation engine 108, the time difference engine 110, and the filter engine 112.

FIG. 1 is described in stages A through C for ease of understanding. In some implementations, operations performed by the system 100 occur in other orders. For example, the computer 106 can obtain user activity 104, filter, and provide filtered data 116 to the server 118 without obtaining a complete set of user activity. The computer 106 can filter and provide filtered data for a first user while simultaneously obtaining and providing filtered data for a second user. The computer 106 can use one or more threaded processing techniques to allow for greater bandwidth of obtained user activity or provided filtered data.

In some implementations, a model used to identify features of the user activity 104 that are important is a deep learning model. A given model can take into account outcomes for user activity and determine which data to include in a filtered data set, such as the filtered data 116. For example, the local computer 106 can train a model to include only features or interactions indicated by the user activity data 104 that are indicative of a user buying a product, e.g., duration of a mouse point hovering over a region of a webpage, duration of a specific scroll location on a webpage, duration of video watched, number of clicks in an area of an application or window, among others. If duration of video watched interaction type is not indicative of a corresponding result, the local computer 106 can remove all elements of the user activity 104 that are identified by the local computer 106 to be of a particular interaction type, e.g., duration of video watched.

In some implementations, the local computer 106 obtains data from more or fewer devices. For example, the local computer 106 can obtain data from 1 or 10000 devices. The devices, similar to the devices 102a-c, can include portable computers, smartphones, smart televisions, among others.

Figure 2:
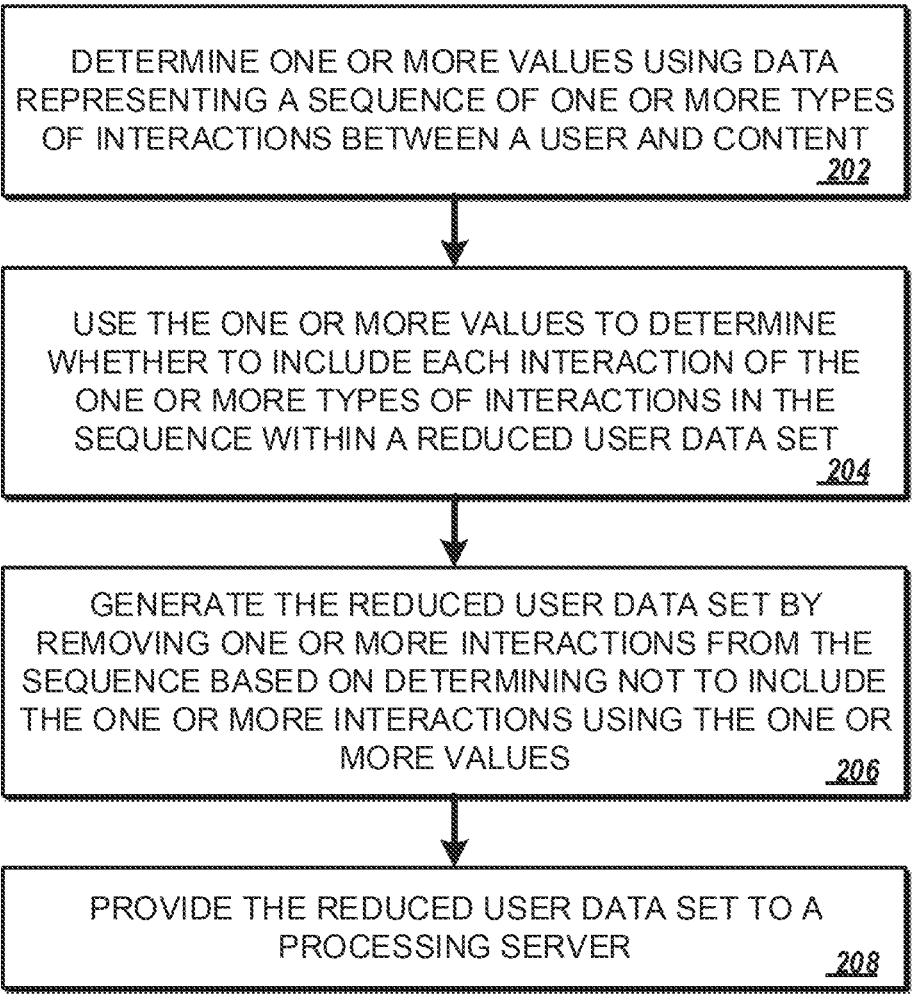
FIG. 2 is a flow diagram illustrating an example of a process for dynamic user data filtering.

FIG. 2 is a flow diagram illustrating an example of a process 200 for dynamic user data filtering. The process 200 may be performed by one or more electronic systems, for example, the system 100 of FIG. 1.

The process 200 includes determining one or more values using data representing a sequence of one or more types of interactions between a user and content (202). For example, the local computer 106 can process the user activity data 104 using the data aggregation engine 108 and the time difference engine 110. The local computer 106 can determine one or more thresholds, such as time duration thresholds, using the user activity 104 to apply as filters to the user activity data 104.

The process 200 includes using the one or more values to determine whether to include each interaction of the one or more types of interactions in the sequence within a reduced user data set (204). For example, the local computer 106 can process the user activity data 104 using the filter engine 112. The local computer 106 can compare one or more time durations in the user activity data 104, indicating a time of an interaction between a user and a given device of the devices 102a-c, with a generated time duration threshold.

In some implementations, the local computer 106 generates a threshold based on a value that is not time. For example, the local computer 106 can generate a threshold for a set of applications running or tabs on a screen indicated as one or more values in the user activity data 104. Similar to the time duration thresholds discussed in this application, thresholds for other values of the user activity data 104 can be used by the local computer 106 to remove corresponding items from the user activity data 104.

The process 200 includes generating the reduced user data set by removing one or more interactions from the sequence based on determining not to include the one or more interactions using the one or more values (206). For example, the local computer 106 can process the user activity data 104 using the filter engine 112. The local computer 106 can use one or more thresholds, such as time duration thresholds, to generate the filtered data set 116 that includes less than all elements, such as electronic records stored in computer memory, of the user activity 104.

The process 200 includes providing the reduced user data set to a processing server (208). For example, as shown in FIG. 1, the local computer 106 can provide the filtered data set 116 to the server 118. The server 118 can include instructions, e.g., provided by the local computer 106, to process the filtered data set 116.

Figure 3:
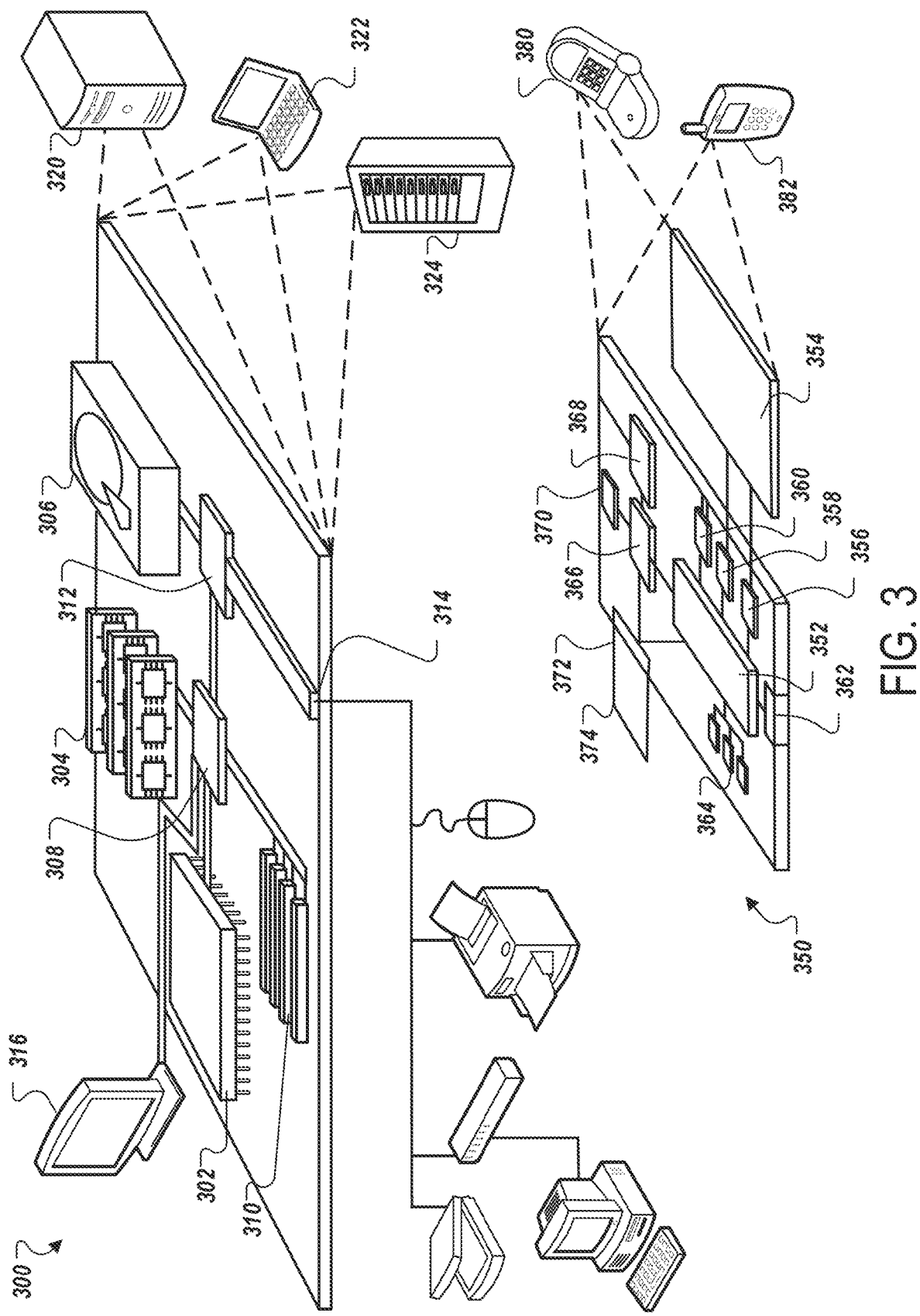
FIG. 3 is a diagram illustrating an example of a computing system used for dynamic user data filtering.

FIG. 3 is a diagram illustrating an example of a computing system used for dynamic user data filtering. The computing system includes computing device 300 and a mobile computing device 350 that can be used to implement the techniques described herein. For example, one or more components of the system 100 could be an example of the computing device 300 or the mobile computing device 350, such as a computer system implementing the local computer 106, devices that access information from the local computer 106, or a server that accesses or stores information regarding the operations performed by the local computer 106.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 302 is a single threaded processor. In some implementations, the processor 302 is a multi-threaded processor. In some implementations, the processor 302 is a quantum computer.

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine readable mediums (for example, the memory 304, the storage device 306, or memory on the processor 302). The high-speed interface 308 manages bandwidth-intensive operations for the computing device 300, while the low-speed interface 312 manages lower bandwidth-intensive operations. Such allocation of functions is an example only. In some implementations, the high speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may include one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may include appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry in some cases. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 368 using a radio frequency. In addition, short-range communication may occur, such as using a Bluetooth, Wi-Fi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, among others) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
    obtaining user activity data that represents a sequence of interactions between a user and content, the sequence including different types of interactions;
    for each interaction action of the sequence, determining a time duration associated with the interaction between the user and the content;
    for a particular type of interaction, determining a time duration threshold based on the time durations for interactions actions of the particular type of action interactions from the sequence;
    for each interaction of the particular type, using the time duration threshold to determine whether to exclude the interaction from a reduced user activity data set;
    generating the reduced user activity data set by selectively removing representations of one or more interactions from the user activity data that have been determined to be excluded from the reduced user activity data set based on the time duration threshold; and
    providing the reduced user data set to a processing server.

2. The method of claim 1, wherein the obtained user activity represents a subset of all user activity data representing interactions between multiple users and the content.

3. The method of claim 2, comprising:
    obtaining an output from a model that is trained to detect important actions using one or more values representing time differences.

4. The method of claim 2, wherein the model is specific to a domain associated with the content.

5. The method of claim 2, wherein determining the time duration threshold comprises:
    wherein the time duration threshold is further determined based on a quantity of interactions of the particular type in the sequence.

6. The method of claim 1, comprising:
    after generating the reduced user activity data, migrating the user activity data to a data storage device with a reduced energy consumption.

7. The method of claim 1, wherein the particular type of interaction comprises a selection interaction while the content is displayed on an output device of a user terminal.

8. The method of claim 1, comprising:
    obtaining a recommendation for the user using the reduced user data set.

9. A non-transitory computer-readable medium storing one or more instructions executable by a computer system, the instructions, when executed by the computer system, performing operations comprising:
    obtaining user activity data that represents a sequence of interactions between a user and content, the sequence including different types of interactions;
    for each interaction action of the sequence, determining a time duration associated with the interaction between the user and the content;
    for a particular type of interaction, determining a time duration threshold based on the time durations for interactions actions of the particular type of action interactions from the sequence;
    for each interaction of the particular type, using the time duration threshold to determine whether to exclude the interaction from a reduced user activity data set;
    generating the reduced user activity data set by selectively removing representations of one or more interactions from the user activity data that have been determined to be excluded from the reduced user activity data set based on the time duration threshold; and
    providing the reduced user activity data set to a processing server.

10. The medium of claim 9, wherein the obtained user activity represents a subset of all user activity data representing interactions between multiple users and the content.

11. The medium of claim 10, wherein the operations comprise:
    obtaining an output from a model that is trained to detect important actions using one or more values representing time differences.

12. The medium of claim 9, wherein the model is specific to a domain associated with the content.

13. The medium of claim 9, wherein determining the time duration threshold comprises:
    wherein the time duration threshold is further determined based on a quantity of interactions of the particular type in the sequence.

14. The medium of claim 9, wherein the operations comprise:
    after generating the reduced user activity data, migrating the user activity data to a data storage device with a reduced energy consumption.

15. The medium of claim 9, wherein the particular type of interaction comprises a selection interaction while the content is displayed on an output device of a user terminal.

16. The medium of claim 9, wherein the operations comprise:
obtaining a recommendation for the user using the reduced user activity data set.

17. A system comprising:
one or more processors; and
machine-readable media interoperably coupled with the one or more processors and storing one or more instructions that, when executed by the one or more processors, perform operations comprising:
obtaining user activity data that represents a sequence of interactions between a user and content, the sequence including different types of interactions;
for each interaction action of the sequence, determining a time duration associated with the interaction between the user and the content;
for a particular type of interaction, determining a time duration threshold based on the time durations for interactions actions of the particular type of action interactions from the sequence;
for each interaction of the particular type, using the time duration threshold to determine whether to exclude the interaction from a reduced user activity data set;
generating the reduced user activity data set by selectively removing representations of one or more interactions from the user activity data that have been determined to be excluded from the reduced user activity data set based on the time duration threshold; and
providing the reduced user activity data set to a processing server.

18. The system of claim 17, wherein the obtained user activity represents a subset of all user activity data representing interactions between multiple users and the content.

19. The system of claim 18, wherein the operations comprise:
obtaining an output from a model that is trained to detect important actions using one or more values representing time differences.

20. The system of claim 17, wherein the model is specific to a domain associated with the content.

\* \* \* \* \*